United States Patent
Loisy

[19]
[11] Patent Number: 6,082,967
[45] Date of Patent: Jul. 4, 2000

[54] CONSTANT-SPEED TWIN SPOOL TURBOPROP UNIT

[75] Inventor: Jean Maurice Loisy, Ponthierry, France

[73] Assignee: Societe Nationale d'Etude et de Construction de Moteurs d'Aviation "Snecma", Paris, France

[21] Appl. No.: 09/047,403

[22] Filed: Mar. 25, 1998

[30] Foreign Application Priority Data

Mar. 27, 1997 [FR] France ................................... 97 03743

[51] Int. Cl.⁷ ...................................................... F02C 3/00
[52] U.S. Cl. .......................... 416/129; 416/124; 416/130; 416/170 R; 415/68; 60/39.162
[58] Field of Search ..................... 416/129, 128, 416/130, 124, 125, 126, 170 R; 415/65, 66, 67, 68, 69; 60/39.161, 39.162, 226.1

[56] References Cited

U.S. PATENT DOCUMENTS 4,738,590  4/1988  Butler ........................................ 416/129
4,751,816  6/1988  Perry ......................................... 416/129

FOREIGN PATENT DOCUMENTS

| 2 197 111 | 3/1974 | France . |
| 2 573 816 | 5/1986 | France . |
| 25 59 172 | 7/1977 | Germany . |
| 1 411 380 | 10/1975 | United Kingdom . |
| 2 174 762 | 11/1986 | United Kingdom . |

*Primary Examiner*—Edward K. Look
*Assistant Examiner*—Richard Woo
*Attorney, Agent, or Firm*—Oblon, Spivak, McClelland, Maier & Neustadt, P.C.

[57] ABSTRACT

A constant-speed twin spool turboprop unit including a twin spool gas generator having a low-pressure spool and a high-pressure spool each including a compressor and a turbine which drives the compressor, is described in which at least one propeller of the unit is driven by at least the high-pressure spool of the gas generator.

10 Claims, 5 Drawing Sheets

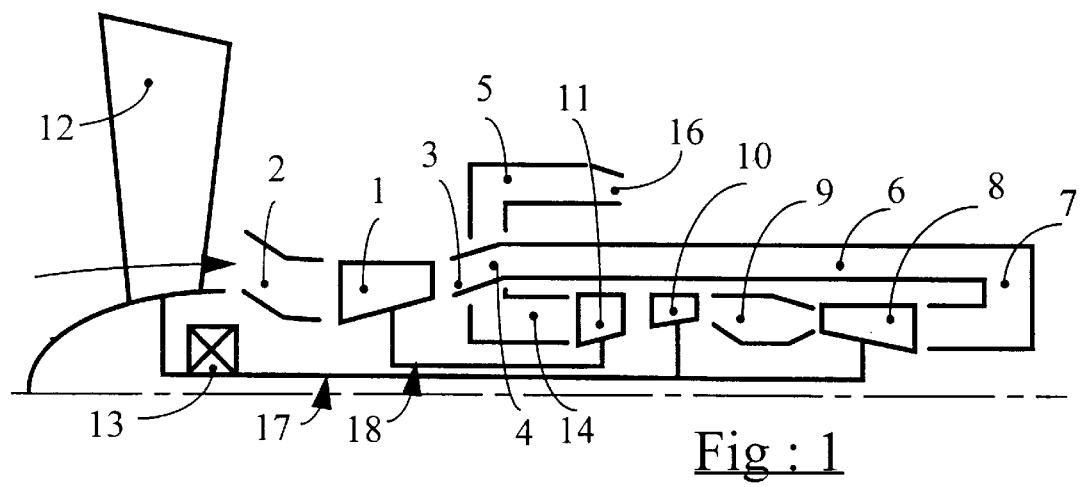
Fig: 1
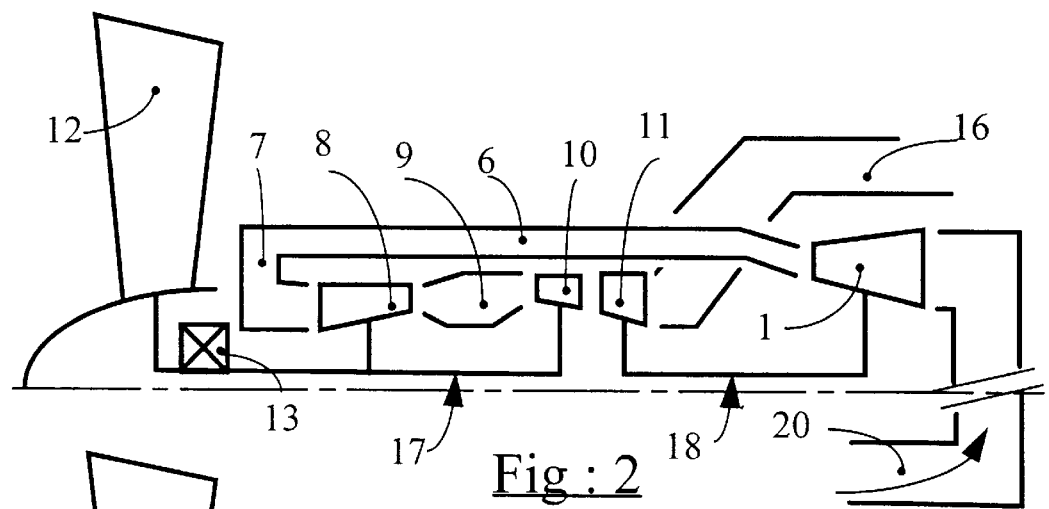
Fig: 2
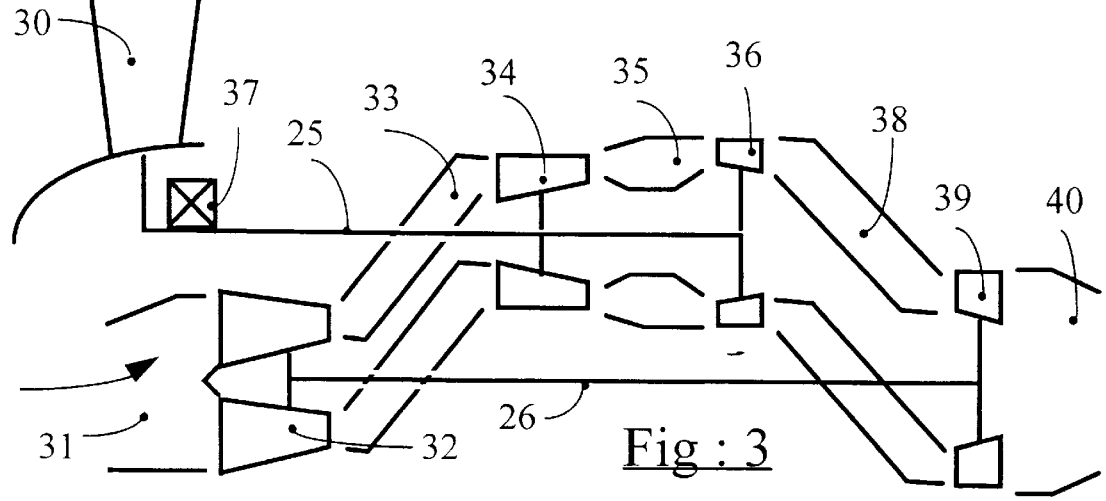
Fig: 3

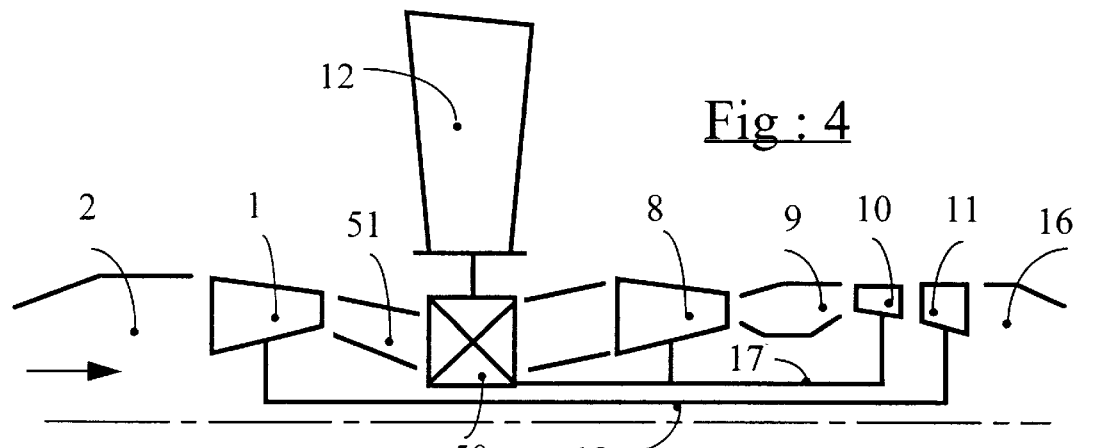
Fig: 4
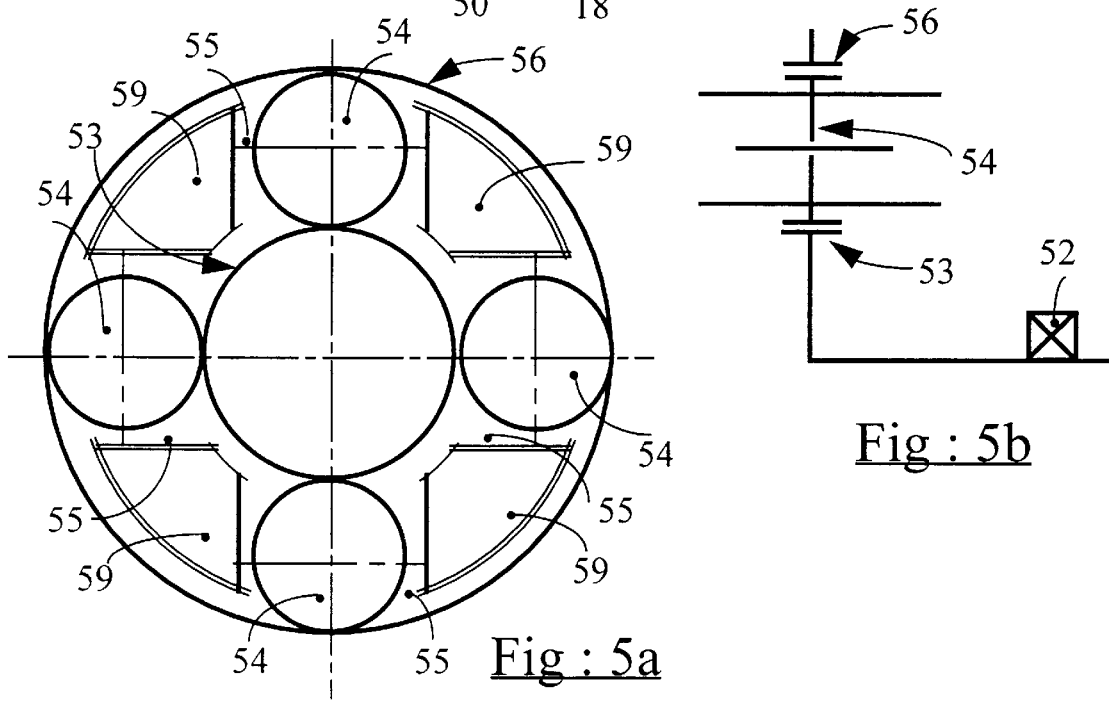
Fig: 5a
Fig: 5b
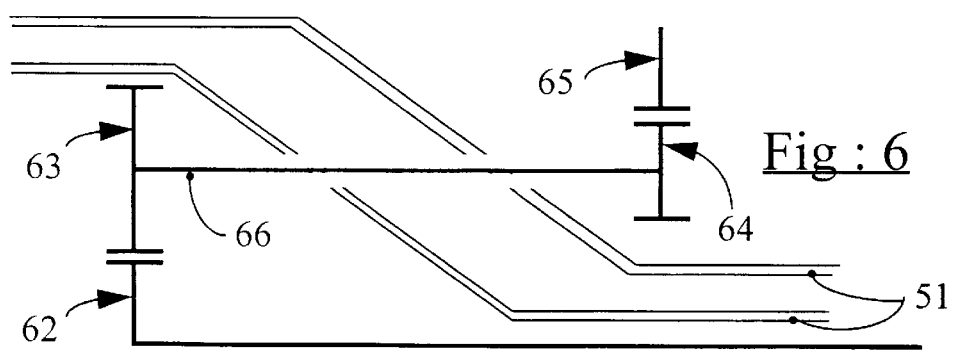
Fig: 6

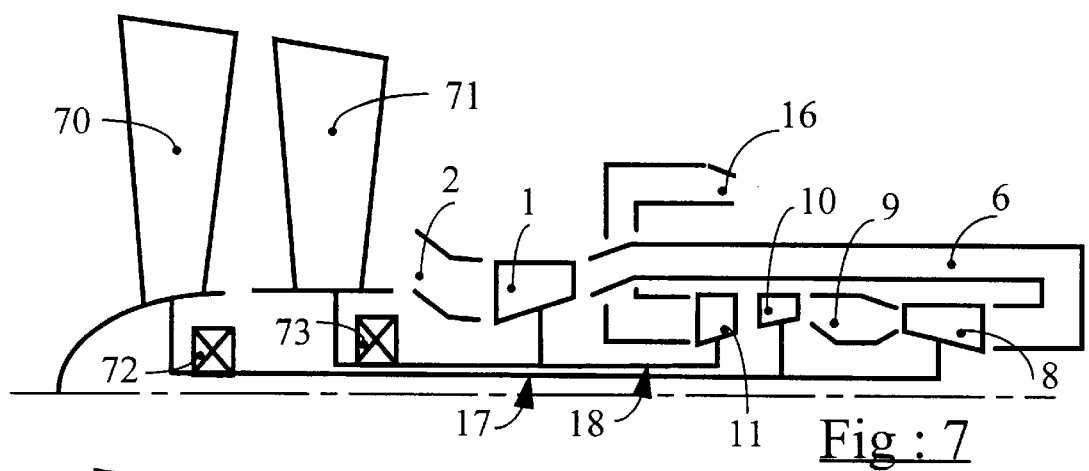
Fig : 7
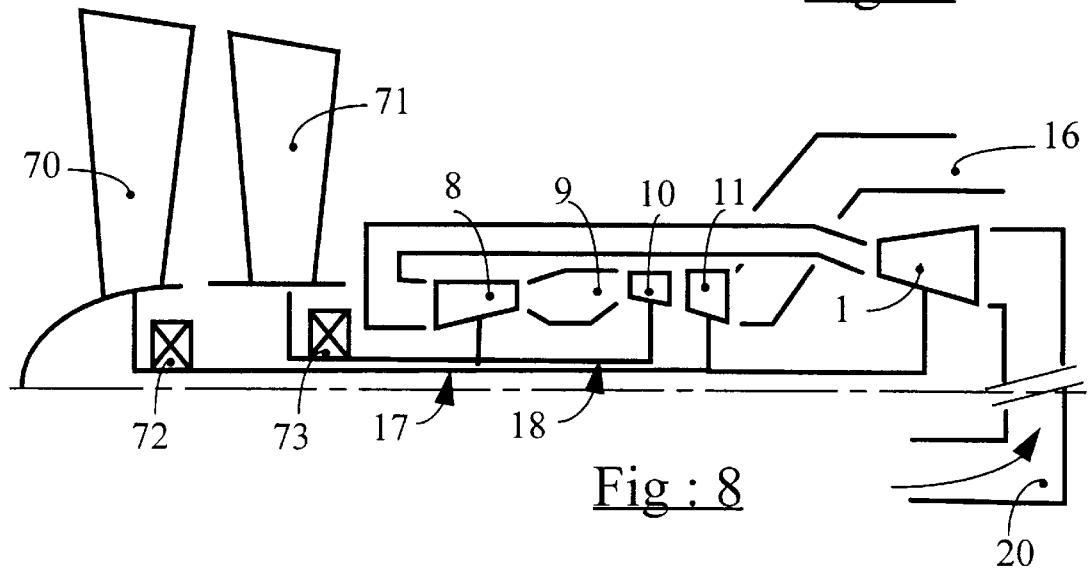
Fig : 8
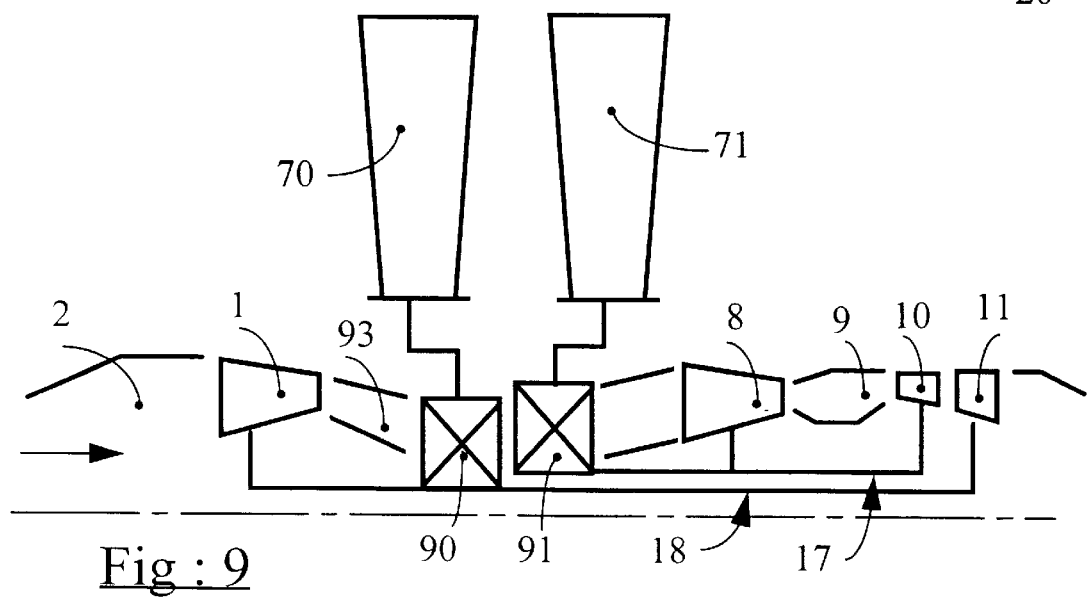
Fig : 9

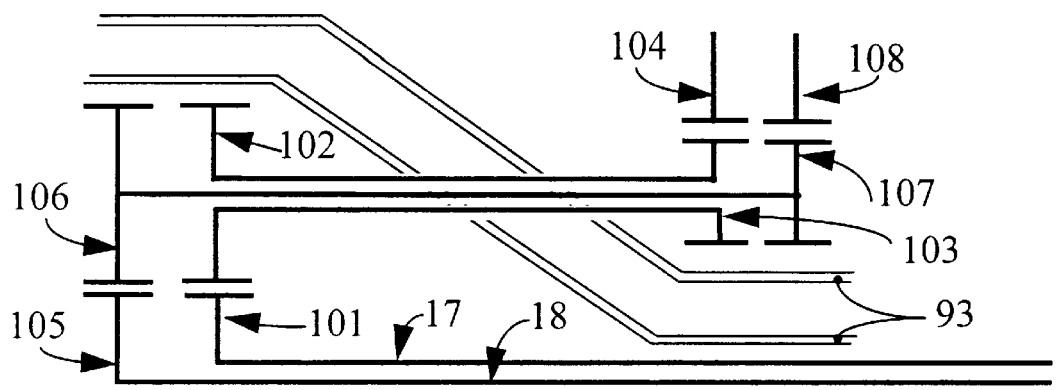
Fig: 10
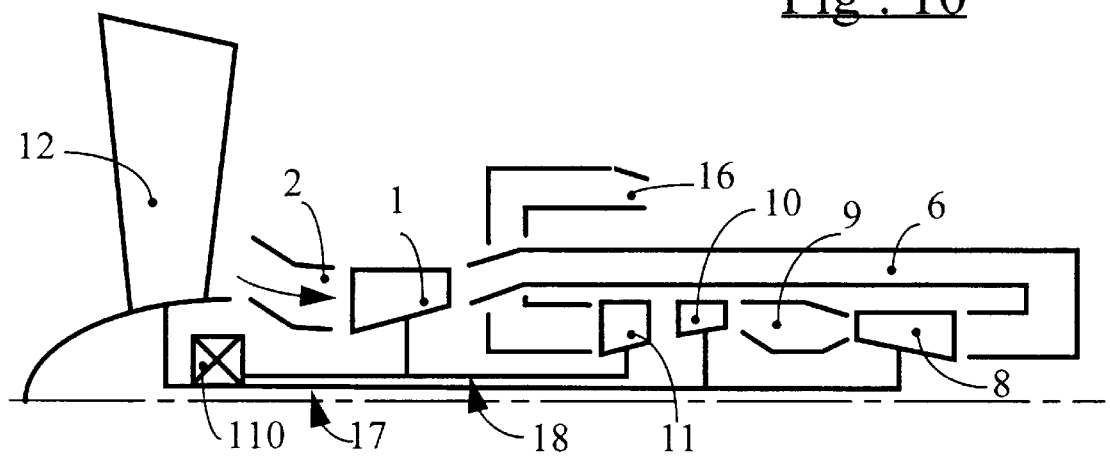
Fig: 11
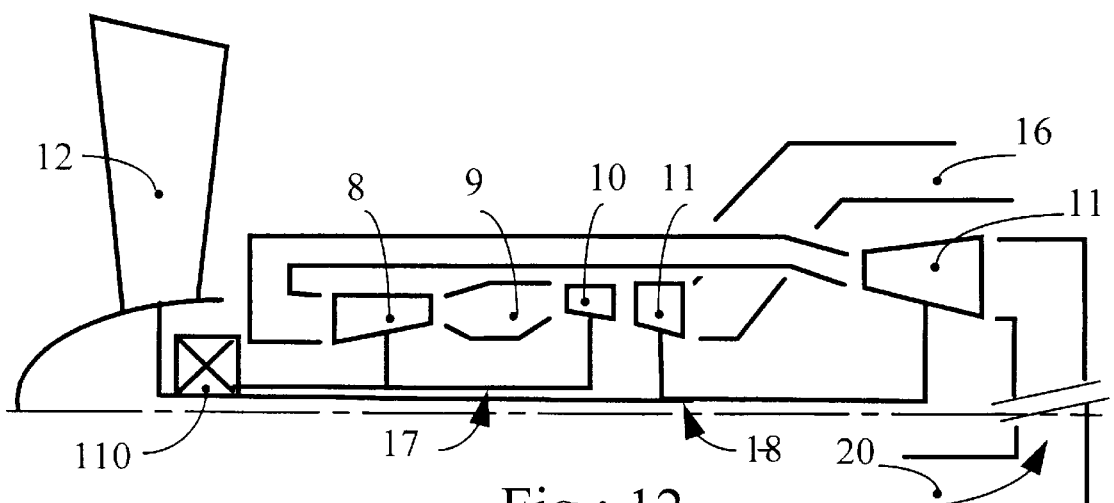
Fig: 12

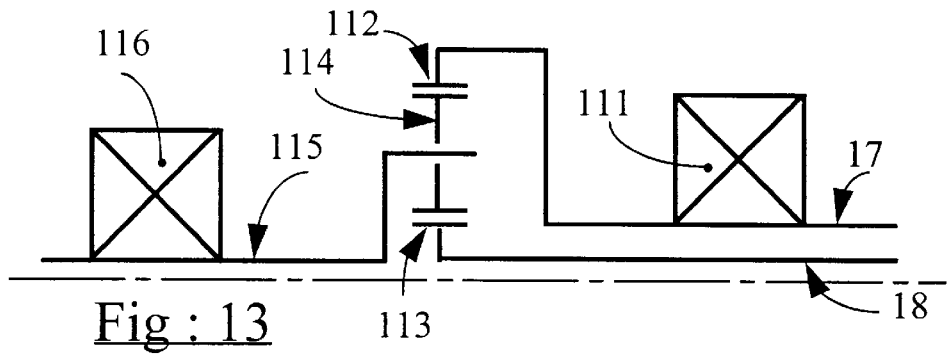
Fig: 13
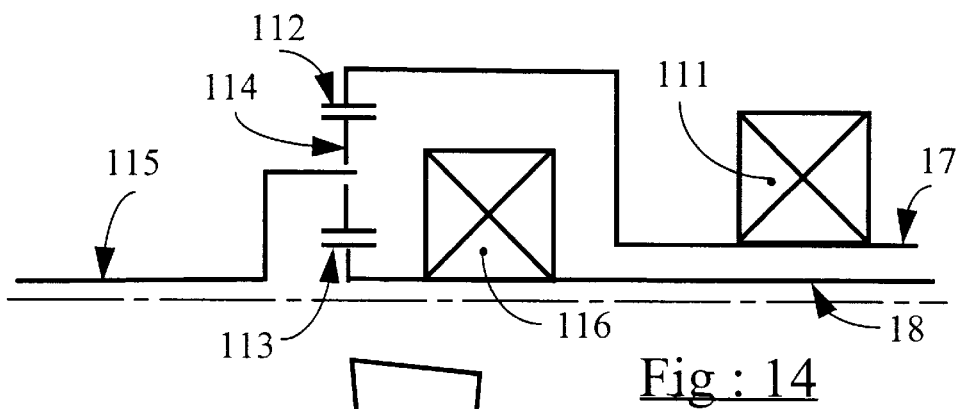
Fig: 14
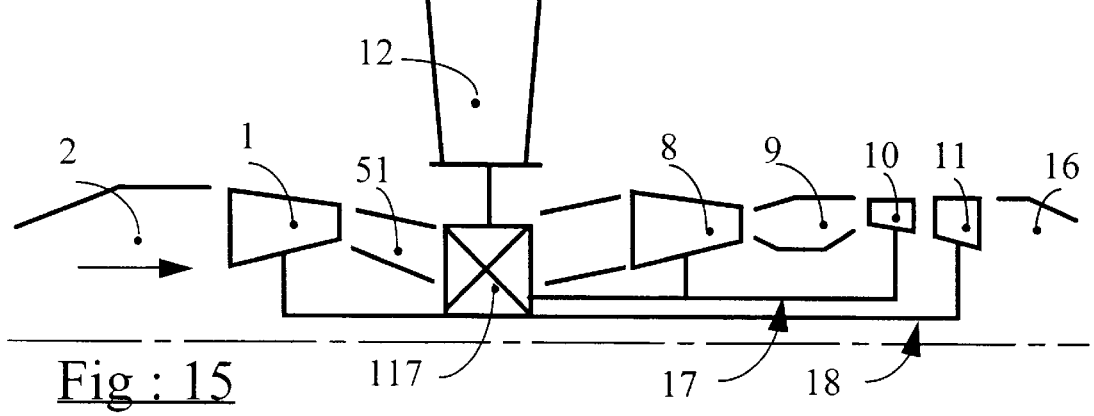
Fig: 15
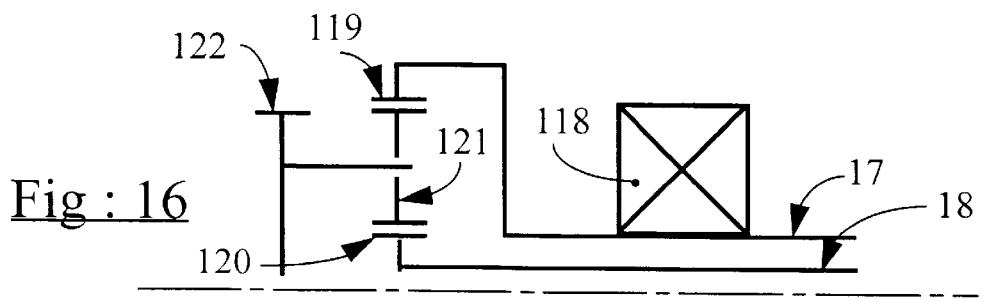
Fig: 16

CONSTANT-SPEED TWIN SPOOL TURBOPROP UNIT

BACKGROUND OF THE INVENTION

1. Field of the Invention

The invention relates to a twin spool turboprop unit having a construction which is well suited to control designed to maintain constant the speed of rotation of the propeller.

2. Summary of the Prior Art

Conventional twin spool turboprops usually comprise independently rotating low-pressure and high-pressure rotor groups or spools each comprising a compressor and a turbine which drives the compressor, the low-pressure compressor delivering at least partially to the high-pressure compressor, and the low-pressure turbine being disposed in series with the high-pressure turbine. The low-pressure rotor group or spool is drivingly connected to a variable-pitch propeller of the turboprop.

This construction is ill suited to constant-speed control of the propeller, since it entails a risk of the low-pressure compressor surging at low engine speeds. When the rate of fuel feed to the engine is low, for example when the aircraft is descending for landing, the rotational speed of the high-pressure compressor is reduced whereas the low-pressure compressor continues to run at high speed. This situation may cause unstable flow conditions in the compressors and the low-pressure compressor has a tendency to surge.

SUMMARY OF THE INVENTION

It is an object of the invention to solve this problem and to provide a twin spool turboprop unit which has a different construction suited to constant-speed control of the propeller without any risk of compressor surging.

To this end, the invention proposes that the propeller, or at least one of the propellers if the turboprop unit has more than one, is driven by at least the high-pressure spool of the twin spool gas generator of the turboprop unit. The term "propeller" includes the high-speed propellers known by the English name of "propfan".

With such a construction, at low engine speeds, when the speed of the low-pressure compressor decreases and the speed of the high-pressure compressor remains constant, the load on the low-pressure compressor decreases and the load on the high-pressure compressor also decreases. There is therefore no compressor surging problem even though the compressors may not have variable geometry.

According to the invention, therefore, there is provided a constant-speed twin spool turboprop unit comprising a twin spool gas generator having a low-pressure spool and a high-pressure spool, and at least one propeller, said low-pressure spool and said high-pressure spool each including a compressor and a turbine which drives said compressor, wherein at least one of said at least one propeller is driven by at least said high-pressure spool of said gas generator.

The propeller driven by the high-pressure spool may be disposed at the front of the turboprop unit and upstream of the gas generator, or it may be disposed between the low-pressure compressor and the high-pressure compressor of the gas generator and around a speed reducing gear assembly through which the propeller is driven.

In a first basic arrangement of the turboprop unit in accordance with the invention, there is a single propeller driven solely by the high-pressure spool of the gas generator. In a second basic arrangement the turboprop unit has two contrarotating propellers, one driven by the high-pressure spool and the other driven by the low-pressure spool of the gas generator. In a third basic arrangement the turboprop unit has a single propeller driven jointly by the high-pressure spool and the low-pressure spool of the gas generator through a torque-distributing reduction gear assembly.

Other preferred features and advantages of the invention will become apparent from the following description of the preferred embodiments, given by way of non-limiting example, with reference to the accompanying drawings.

BRIEF DESCRIPTION OF THE DRAWINGS

FIG. 1 is a diagrammatic axial longitudinal half-sectional view through one embodiment of a turboprop unit in accordance with a first basic arrangement of the invention;

FIG. 2 is a view similar to FIG. 1, but showing a second embodiment of a turboprop unit in accordance with the first basic arrangement of the invention;

FIG. 3 is a view similar to FIG. 1, but showing a third embodiment of a turboprop unit in accordance with the first basic arrangement of the invention;

FIG. 4 is a view similar to FIG. 1, but showing a fourth embodiment of a turboprop unit in accordance with the first basic arrangement of the invention;

FIG. 5a is a diagrammatic cross-sectional view of one example of a planetary reduction gear assembly for the turboprop unit shown in FIG. 4;

FIG. 5b is a diagrammatic longitudinal axial half-sectional view of the reduction gear assembly of FIG. 5a;

FIG. 6 is a view similar to FIG. 5b, but showing another example of a planetary reduction gear assembly suitable for the turboprop unit shown in FIG. 4;

FIG. 7 is a diagrammatic axial longitudinal half-sectional view through one embodiment of a turboprop unit comprising two contrarotating variable-pitch propellers or propfans in accordance with a second basic arrangement of the invention;

FIG. 8 is a view similar to FIG. 7, but showing a second embodiment of a turboprop unit in accordance with the second basic arrangement of the invention;

FIG. 9 is a view similar to FIG. 7, but showing a third embodiment of a turboprop unit in accordance with the second basic arrangement of the invention;

FIG. 10 is a diagrammatic axial longitudinal half-sectional view of one example of a reduction gear assembly suitable for the turboprop unit shown in FIG. 9;

FIG. 11 is a diagrammatic axial longitudinal half-sectional view through one embodiment of a turboprop unit comprising a propeller driven jointly by the high-pressure and the low-pressure spools in accordance with a third basic arrangement of the invention;

FIG. 12 is a view similar to FIG. 11, but showing a second embodiment of a turboprop unit in accordance with the third basic arrangement of the invention;

FIG. 13 is a diagrammatic axial longitudinal half-sectional view of one example of a torque-distributing reduction gear assembly suitable for the turboprop unit shown in FIG. 12;

FIG. 14 is a view similar to FIG. 13, but showing another example of a torque-distributing reduction gear assembly suitable for the turboprop unit shown in FIG. 12;

FIG. 15 is a view similar to FIG. 11, but showing a third embodiment of a turboprop unit in accordance with the third basic arrangement of the invention; and FIG. 16 is a diagrammatic axial longitudinal half-sectional view of one example of a torque-distributing reduction gear assembly suitable for the turboprop unit shown in FIG. 15.

DESCRIPTION OF THE PREFERRED EMBODIMENT

In accordance with a first basic arrangement of the invention the twin-spool turboprop units diagrammatically shown in FIGS. 1 to 4 comprise a variable pitch propeller, or a propfan, driven by the high-pressure spool of a twin spool gas generator. In FIGS. 1 to 3 the propeller is disposed at the front of the engine and upstream of the gas generator. In FIG. 4 the propeller is disposed around the gas generator. These constructions have the advantage of enabling the rotational speed of the propeller and the high-pressure spool to be kept constant without any risk of the compressors surging, even if the compressors do not have variable geometry.

In FIG. 1 the gas generator comprises a low-pressure compressor 1 connected to an annular air intake 2. The outlet of the low-pressure compressor is connected to an annular duct 3 which then divides into a number of separate ducts 4 to accommodate gas exhaust pipes 5 (for the sake of clarity only one such pipe is shown in FIG. 1). The separate ducts 4 rejoin one another subsequently to form a new annular duct 6 having a first bend 7 at its downstream end connected to a high-pressure compressor 8. The gas flow direction undergoes a 180° reversal in the first bend 7. The compressed air leaving the high-pressure compressor 8 enters an annular combustion chamber 9 which supplies hot gases to turbines 10, 11 driving the high-pressure and low-pressure compressors respectively. The high-pressure turbine also drives the propeller or propfan 12 through a speed reducer 13, as well as driving the engine and aircraft ancillaries (not shown). The purpose of the reducer is to reduce the rotational speed of the propeller or propfan. The low-pressure turbine is followed by an annular gas exhaust duct 14 which subsequently divides into a number of pipes 5 (only one of which is shown in FIG. 1) which cross the separate ducts 4 by way of a second bend in which the gas flow direction undergoes a further 180° change of direction. The pipes 5 then rejoin one another to form an annular chamber or two side nozzles 16 for ejection of the burnt gases.

In the embodiment of FIG. 1 the driving shafts 17, 18 of the high-pressure and low-pressure spools are coaxial. If required, the low-pressure and high-pressure compressors can have variable-pitch stators.

FIG. 2 shows a second embodiment which is a variant of the type of turboprop unit shown in FIG. 1, and like elements have the same numerical references as in FIG. 1. In this variant the air intake 20 of the gas generator is not annular but is disposed below the nacelle (not shown) of the turboprop unit, and the gas flow direction in the gas generator is the reverse of that shown in FIG. 1. The geometric arrangement of the high-pressure spool upstream of the low-pressure spool means that the high-pressure spool does not extend through the low-pressure spool and enables the high-pressure shaft 17 to be shorter than in the turboprop unit of FIG. 1.

FIG. 3 shows another embodiment of a turboprop unit of the type comprising a variable-pitch propeller or propfan 30 driven by the high-pressure spool of a twin spool gas generator.

This embodiment differs from those of FIGS. 1 and 2 in that the high-pressure and low-pressure shafts 25, 26 driving the high-pressure and low-pressure spools respectively are not coaxial. Also, in this embodiment the gas flow undergoes no reversal of direction, the gas flowing between an air intake 31 disposed at the front of the engine and an exhaust nozzle 40 disposed at the rear of the engine.

The elements which make up the gas generator are the same as in FIGS. 1 and 2. These elements consist of: a low-pressure compressor 32 and a high-pressure compressor 34, possibly having variable-pitch stators, and an annular duct 33 interconnecting the compressors 32, 34; an annular combustion chamber 35; a high-pressure turbine 36 which drives the high-pressure compressor 34, drives the propeller or propfan 30 through a speed reducer 37, and also drives the engine and aircraft ancillaries (not shown); a low-pressure turbine 39 which drives the low-pressure compressor and which is fed from the high-pressure turbine by an annular duct 38; and an exhaust nozzle 40.

FIG. 4 shows a fourth embodiment of a turboprop unit of the type comprising a variable-pitch propeller or propfan 12 driven by the high-pressure spool of a twin spool gas generator. In this embodiment the propeller or propfan 12 is not disposed upstream of the gas generator as in the embodiments shown in FIGS. 1 to 3, but is disposed between the low-pressure and high-pressure compressors 1, 8 and around a reduction gear 50 incorporated in an annular casing 51 disposed between the outlet of the low-pressure compressor 1 and the inlet of the high-pressure compressor 8. The high-pressure and low-pressure spools are coaxial, and all the elements which make up the gas generator are the same as those shown in FIGS. 1 and 2 and have the same references as in those figures.

This fourth embodiment enables the length of the high-pressure shaft 17 to be shortened compared with that in the FIG. 1 embodiment, and, as in the embodiment shown in FIG. 3, the gas flow between the air intake and the exhaust nozzle 16 undergoes no reversal of direction. However, this fourth embodiment does require a reduction gear assembly, one example of which is shown in FIGS. 5a and 5b.

In this example the reduction gear assembly 50 incorporated in the annular casing 51 comprises a first planetary or epicyclic reduction gear 52 rotated by the high-pressure spool of the gas generator. This first reduction gear 52 rotates a sun wheel 53, which drives planet wheels 54 disposed in radial arms 55 of the casing. A toothed crown wheel 56 is rotated by the planet wheel 54 and is rigidly secured to the propeller 12. Ducts 59 between the radial arms 55 serve to conduct the air flow from the outlet of the low-pressure compressor 1 to the inlet of the high-pressure compressor 8.

Another example of a speed reducing gear assembly which may be used is shown in FIG. 6. This example differs from that shown in FIGS. 5a and 5b by using double planet wheels 63, 64. This provides a higher reduction ratio than a single planet wheel and thus makes it possible to omit a first reduction gear corresponding to the gear 52 of FIG. 5b.

The speed reducing gear assembly shown in FIG. 6 comprises a sun wheel 62 rotated by the high-pressure spool, first planet wheels 63 rotated by the sun wheel 62, second planet wheels 64 connected to the first planet wheels 63 by shafts 66 which extend inside the arms of the casing 51, and a toothed crown wheel 65 meshing with the second planet wheels 64 and rigidly secured to the propeller or propfan 12.

In a second type of turboprop unit in accordance with the invention, three embodiments of which are shown diagrammatically in FIGS. 7 to 9, the turboprop unit comprises two independent contrarotating variable pitch propellers or propfans 70, 71. The first propeller 70 is driven by the high-pressure spool of a twin spool gas generator and the second propeller 71 is driven by the low-pressure spool of the gas generator. The turboprop units shown in FIGS. 7 to 9 are so constructed that the rotational speed of the two propellers can be kept constant without any risk of compressor surge even if the compressor geometry is invariable.

FIG. 7 shows an embodiment of this second type of turboprop unit in which the flow and evolution of the gases are the same as described with reference to FIG. 1, and identical elements have the same numerical references as in FIG. 1. The first propeller 70 is driven by the high-pressure spool of the gas generator through a first reduction gear 72, and the second propeller 71 is driven by the low-pressure spool of the gas generator through a second reduction gear 73. The high-pressure turbine 10 drives, via the shaft 17 of the high-pressure spool, the high-pressure compressor 8, the first propeller 70 (through the first reduction gear 72), and also the engine and aircraft ancillaries (not shown). The low-pressure turbine 11 drives, via the shaft 18 of the low-pressure spool, the low-pressure compressor 1 and the second propeller 71 through the second reduction gear 73. This second reduction gear 73 must be planetary to allow the passage of the structures (not shown) which retain the fixed parts of the first reduction gear 72.

FIG. 8 shows another embodiment of the second type of turboprop unit in accordance with the invention. In this embodiment the flow and evolution of the gases are the same as described with reference to FIG. 2, and the structure differs from the structure of the FIG. 7 embodiment in having the high-pressure spool arranged upstream of the low-pressure spool, in having an air intake 20 which is not annular and is disposed below the nacelle of the turboprop unit, and in that the first propeller 70 is driven through the reduction gear 72 by the low-pressure shaft 18 whereas the second propeller 71 is driven through the reduction gear 73 by the high-pressure shaft 17. As in the FIG. 7 embodiment, the second reduction gear 73 must be planetary.

FIG. 9 shows a third embodiment of the second type of turboprop unit of the invention wherein the unit comprises a pair of contrarotating variable-pitch propellers 70, 71. In this embodiment the gas flow path is identical to that described with reference to FIG. 4, and the propellers 70, 71 are disposed between the low-pressure and high-pressure compressors 1 and 8 and respectively around a first speed reducing gear 90 and a second speed reducing gear 91. The two speed reducing gears 90, 91 are incorporated in an annular casing 93 of the gas generator between the outlet of the low-pressure compressor 1 and the inlet of the high-pressure compressor 8. The low-pressure shaft 18 and the high-pressure shaft 17 contrarotate.

The first and second propellers 70, 71 are driven through the first and second speed reducing gears 90, 91 respectively by the low-pressure and high-pressure spools. The first and second reduction gears 90, 91 may be of the kind described with reference to FIGS. 5a and 5b, in which case the planet wheels of the second reduction gear 91 are disposed behind the planet wheels of the first reduction gear 90 in the same arms of the casing 93. Alternatively, the first and second reduction gears 90, 91 may be of the kind described with reference to FIG. 6. In this case the planet wheels of the second reduction gear 91 can be placed either in different arms of the casing 93 or in the same arms of the casing 93. If placed in the same casing arms the planet wheels of the two reduction gears 90, 91 must be coaxial.

FIG. 10 shows an example of a speed reduction gear assembly wherein the two reduction gears are of the kind described with reference to FIG. 6. The double planet wheels 102, 103 of the second reduction gear 91 are placed in the same arms of the casing 93 and are coaxial with the double planet wheels 106, 107 of the first reduction gear 90. The high-pressure spool drives the first propeller 70 through the gear wheels 101–104 and the low-pressure spool drives the second propeller 71 through the gear wheels 105–108.

In a third type of turboprop unit in accordance with the invention, three-embodiments of which are diagrammatically shown in FIGS. 11, 12 and 15, the turboprop unit comprises a variable-pitch propeller or propfan 12 driven jointly by the high-pressure and low-pressure spools of a twin spool gas generator through a torque-distributing reduction gear assembly. The construction of the turboprop units shown in FIGS. 11, 12 and 15 enables the speed of the propeller 12 or propfan to be maintained constant without any risk of surging of the low-pressure and high-pressure compressors, even if the compressor geometry is invariable, provided that the high-pressure spool provides a substantial proportion of the power output by the turboprop unit. However, the use of variable geometry in the compressors enables the speed of the low-pressure and high-pressure spools to be kept constant.

FIG. 11 shows an embodiment of this third type of turboprop unit wherein the gas flow path is the same as described with reference to FIG. 1, and identical elements have the same numerical references as in FIG. 1. The high-pressure turbine 10 drives the high-pressure compressor 8 and the aircraft and engine ancillaries (not shown), and also participates in the drive of the propeller or propfan 12 by way of a torque-distributing reduction gear assembly 110. The low-pressure turbine 11 drives the low-pressure compressor 1 and participates jointly with the high-pressure turbine 10 in driving the propeller or propfan 12 by way of the torque-distributing reduction gear assembly 110.

FIG. 12 shows another embodiment of the third type of turboprop unit, in which the gas flow path is the same as described with reference to FIG. 2. This embodiment differs from that shown in FIG. 11 in the arrangement of the high-pressure spool upstream of the low-pressure spool, and in having an air intake 20 disposed below the nacelle of the turboprop unit. Also, the roles of the low-pressure and high-pressure spools in the torque-distributing reduction gear assembly 110 are changed over.

FIG. 13 shows an example of a torque-distributing reduction gear assembly 110 suitable for the turboprop unit of FIG. 12. The assembly 110 comprises a first reduction gear 111 driven by the high-pressure spool of the gas generator of the turboprop unit, this first gear 111 driving a toothed crown wheel 112. The low-pressure spool of the gas generator drives a sun wheel 113 which, together with the crown wheel 112, drives a shaft 115 via intermediate planet wheels 114, the shaft 115 driving the propeller or propfan 12 through a second reduction gear 116. This torque-distributing reduction gear assembly maintains a constant ratio between the driving torques supplied by the high-pressure and low-pressure spools.

FIG. 14 shows an alternative arrangement for the torque-distributing reduction gear assembly shown in FIG. 13. In this alternative the reduction gear assembly comprises a first reduction gear 111 which is driven by the high-pressure spool of the gas generator and is arranged to drive a toothed crown wheel 112, and a second reduction gear 116 which is driven by the low-pressure spool and is arranged to drive a sun wheel 113. The toothed crown wheel 112 and the sun wheel 113 corotate and, by way of planet wheels 114, drive a shaft 115 which is rigidly secured to the propeller 12 or fan.

FIG. 15 shows a third embodiment of the third type of turboprop unit, wherein the gas flow path is the same as described with reference to FIG. 4, and the propeller 12 is disposed between the low-pressure and high-pressure compressors 1 and 8 and around the torque-distributing reduction gear assembly 117. The assembly 117 is incorporated in the annular casing 51 between the low-pressure and high-pressure compressors 1 and 8, and the propeller or propfan 12 is driven jointly by the high-pressure and low-pressure spools through the assembly 117.

FIG. 16 shows an example of a torque-distributing reduction gear assembly suitable for the turboprop unit shown in FIG. 15. This assembly comprises a first speed reducing gear 118 driven by the high-pressure spool of the gas generator of the turboprop unit, and a toothed crown wheel 119 driven by the reducing gear 118. The low-pressure spool drives a sun wheel 120 which, together with the toothed crown wheel 119, drives a sun wheel 122 through planet wheels 121. The sun wheel 122 drives the propeller or propfan 12 by way of a second planetary reduction gear identical to that described with reference to FIGS. 5a and 5b or with reference to FIG. 6.

This torque-distributing reduction gear assembly maintains a constant ratio between the drive torques supplied by the high-pressure and low-pressure spools of the turboprop unit.

As will be appreciated, the invention is not limited to the embodiments hereinbefore described. For example, in the embodiments shown in FIGS. 1 to 4, 11, 12 and 15 the single propeller may be replaced by a pair of contrarotating propellers interconnected by an appropriate mechanical transmission, or by any other receiver, such as a helicopter rotor. Also, in all of the embodiments the propeller of the turboprop unit may be constituted by a propfan.

What is claimed is:

1. A constant-speed twin spool turboprop unit comprising a twin spool gas generator having a low-pressure spool and a high-pressure spool, and at least one propeller, said low-pressure spool including a low-pressure compressor, a low-pressure shaft and a low-pressure turbine which drives the low-pressure compressor via the low-pressure shaft, and said high-pressure spool including a high-pressure compressor, a high-pressure shaft and a high-pressure turbine which drives said high-pressure compressor via the high-pressure shaft, wherein at least one of said at least one propeller is driven by at least said high-pressure turbine via the high-pressure shaft.

2. A turboprop unit according to claim 1, wherein the at least one propeller driven by said high-pressure spool has a variable pitch.

3. A turboprop unit according to claim 1, wherein the at least one propeller driven by said high-pressure spool is driven through a speed reducing gear assembly.

4. A turboprop unit according to claim 1, wherein the at least one propeller driven by said high-pressure spool is disposed at the front of said turboprop unit and upstream of said gas generator.

5. A turboprop unit according to claim 3, wherein the at least one propeller driven by said high-pressure spool is disposed between the compressor of said low-pressure spool and the compressor of said high-pressure spool and around said speed reducing gear assembly.

6. A turboprop unit according to claim 5, wherein said speed reducing gear assembly is of the planetary type.

7. A turboprop unit according to claim 1, wherein the at least one propeller driven by said high-pressure spool is driven jointly by said high-pressure spool and said low-pressure spool through a torque-distributing reduction gear assembly.

8. A turboprop unit according to claim 1, wherein said at least one propeller comprises a first propeller and a second propeller, and wherein said first propeller is driven by said high-pressure spool and said second propeller is driven by said low-pressure spool so as to contrarotate relative to said first propeller.

9. A turboprop unit according to claim 8, wherein said first propeller is driven through a first speed reducing gear assembly, and said second propeller is driven through a second speed reducing gear assembly which is of the planetary type.

10. A turboprop unit according to claim 1, wherein the at least one propeller driven by said high-pressure spool is a high-speed propeller of the propfan type.

* * * * *